United States Patent [19]

Gabano et al.

[11] 4,228,229
[45] Oct. 14, 1980

[54] LITHIUM PRIMARY CELL CONTAINING THIONYL CHLORIDE

[75] Inventors: Jean-Paul Gabano, Poitiers; Jean-Yves Grassien, Gizay par La Villedieu du Clain, both of France

[73] Assignee: Saft-Societe des Accumulateurs Fixes et de Traction, Romainville, France

[21] Appl. No.: 4,544

[22] Filed: Jan. 18, 1979

[30] Foreign Application Priority Data

Jan. 31, 1978 [FR] France ................. 78 02601
Feb. 17, 1978 [FR] France ................. 78 04530

[51] Int. Cl.$^3$ .................................... H01M 6/14
[52] U.S. Cl. ................................ 429/196; 429/199
[58] Field of Search ........... 429/196, 194, 197, 199, 429/101, 105, 48

[56] References Cited

U.S. PATENT DOCUMENTS

| | | | |
|---|---|---|---|
| 3,922,174 | 11/1975 | Heller | 429/196 |
| 3,926,669 | 12/1975 | Auborn | 429/196 |
| 3,993,501 | 11/1976 | Kalnoki-Kis | 429/48 |
| 4,093,784 | 6/1978 | Driscoll | 429/101 |

FOREIGN PATENT DOCUMENTS 2079744 11/1971 France.
2166015 8/1973 France.
2305863 10/1976 France.
1409307 10/1975 United Kingdom.

Primary Examiner—Anthony Skapars
Attorney, Agent, or Firm—Kenyon & Kenyon

[57] ABSTRACT

An electrical primary cell using lithium as its negative active material and whose positive active material includes thionyl chloride. The electrolyte of the cell is a solution including the thionyl chloride as a solvent. The solute is a complex salt resulting from the reaction of at least one of the following compounds with aluminum chloride:

lithium oxide $Li_2O$;
lithium sulphide $Li_2S$;
calcium oxide $CaO$; and
barium oxide $BaO$.

15 Claims, 11 Drawing Figures

LITHIUM PRIMARY CELL CONTAINING THIONYL CHLORIDE

The present invention relates to a primary cell whose negative active material is lithium, and which contains thionyl chloride which constitutes at least a part of the solvent of the electrolyte and/or of the positive active material.

The use of thionyl chloride as an electrolyte solvent and as a positive active material has already been described in French Pat. No. 70 04 833 published under the number 2 079 744. More recently, French Pat. No. 72 46 158 published under the number 2 166 015 has described cells whose positive active material is, inter alia, thionyl chloride. In cells which are to be stored for some time before use, the use of a liquid positive active material which also acts at the same time as a solvent for the electrolyte (with or without addition of a co-solvent) is only possible provided that there is some degree of passivation of the lithium negative electrode, since the liquid necessarily comes into contact therewith. This passivation phenomenon is related to the observation that the cell potential rises slowly before reaching its operational value when this type of cell is brought into use after a period of storage.

To remedy this drawback French Pat. No. 76 08 397 published under the No. 2 305 863, proposes covering the negative electrode with a thin layer of a vinyl polymer. However, this requires special treatment of the negative electrode and precise adjustment of the thickness of the polymer layer, since it must be thick enough to protect the lithium effectively while not being so thick that it increases the internal resistance of the cell unnecessarily.

Preferred embodiments of the invention mitigate these drawbacks and provide a cell which arrives at its normal operating potential from the beginning of discharge.

The present invention provides an electrochemical primary cell whose negative active material is lithium, whose positive active material includes thionyl chloride, and whose electrolyte is composed of at least one solvent and at least one solute, the solvent including at least the said thionyl chloride and the solute including a complex salt resulting from the reaction of at least one ionisable compound with aluminum chloride, wherein the said ionisable compound comprises lithium sulphide $Li_2S$, lithium oxide $Li_2O$, calcium oxide CaO, or barium oxide BaO.

According to preferred embodiments of the invention, the molar concentration of lithium sulphide or of lithium calcium or barium oxides in the electrolyte is substantially equal to half the molar concentration of the aluminum chloride.

It should be noted that the above-mentioned patent No. 76 08 397 suggests as a solute for the electrolyte, firstly a list of Lewis acids, which list includes inter alia aluminum chloride, and secondly a list of ionisable salts, which list includes lithium sulphide. It is nonetheless certain that the reaction of lithium sulphide with aluminum chloride has not previously been contemplated since this action has the particular effect of making the measures set out in the said patent unnecessary.

Further, the complex salt resulting from the reaction of lithium sulphide with aluminum chloride hardly seems to have been mentioned previously.

The invention will be better understood from the following detailed description given by way of example with reference to the accompanying drawings, in which.

Figure 1:
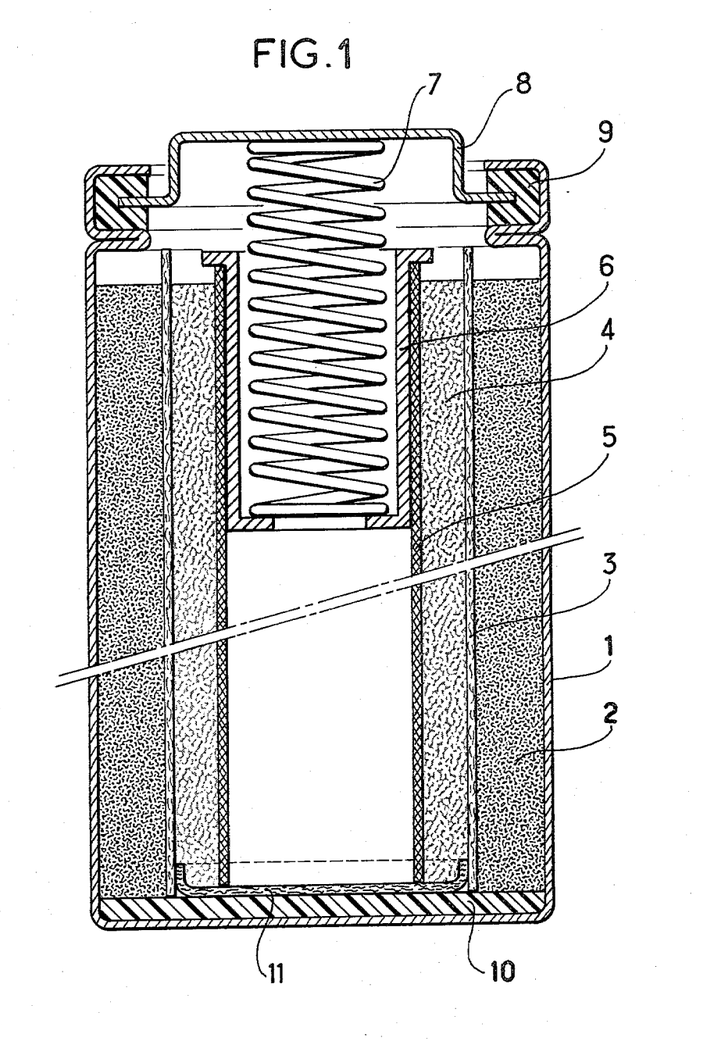
FIG. 1 is a diagrammatic cross-section of an embodiment of a cell in accordance with the invention.
Figure 2:
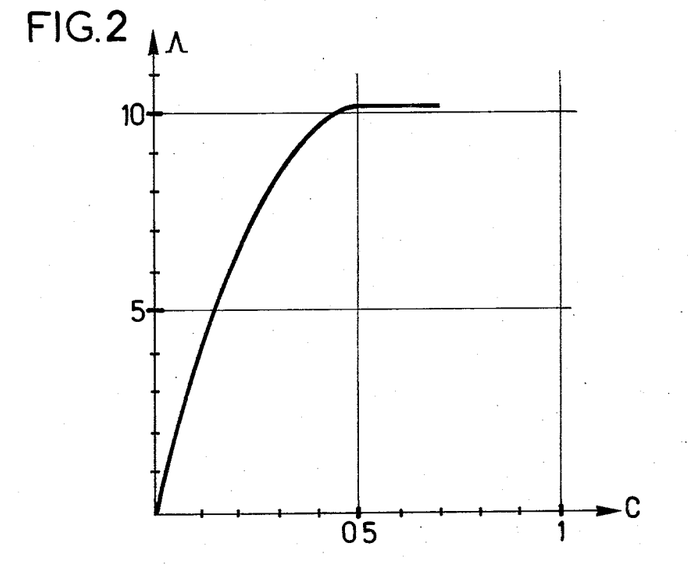
FIG. 2 is a graph showing the variation in the conductivity of a solution of aluminum chloride in thionyl chloride while lithium sulphide is added thereto.

An example of a primary cell in accordance with the invention and illustrated in FIG. 1 is of cylindrical shape and has the following dimensions:

Height: 3.73 cm, Diameter: 1.15 cm.

A stainless steel can 1 contains a carbon cathode collector mass 2. It may be obtained by mixing polytetrafluoroethylene with acetylene black using about 15% by weight of polytetrafluoroethylene in the dry state. This mixture is dried and sintered into the shape of a ring against the walls of the can 1 and has a porosity of about 82%. A glass fibre separator 3 is interposed between the collector 2 and a negative electrode 4 of lithium. The lithium electrode 4 is composed of two half-cylinders which are separated along a plane passing through the axis of the cylindrical cell. A cylindrical metal braid 5 is placed inside the half-cylinders and is acted upon by a spring 7 which tends to shorten it and to widen it by means of a metal distance piece 6. In this manner, the half-cylinders of the negative electrode 4 constantly bear against the separator 3 as is described in our published French patent application No. 2 388 414. The braid 5 acts as the negative collector and the current flows through the metal distance piece 6 and the spring 7 to a cap 8 of the cell. The cap 8 is separated from the can 1 by an insulating seal 9. The base of the can is isolated in a known manner by a base disc 10 and a centering cup 11. The apparent internal surface area of the collector 2 is 8.57 cm². The cell contains about 2.5 cm³ of thionyl chloride solution in accordance with the invention, which acts both as an electrolyte and as a positive active material.

Two types of thionyl chloride solution are described in detail below. FIGS. 2 to 5 relate to a first type of solution prepared in the following manner.

A molar solution of aluminum chloride in thionyl chloride was taken, and lithium sulphide was added thereto little by little while observing the conductivity of the solution on a measuring instrument. The graph shown in FIG. 2 was thereby obtained, where the y-axis shows conductivity, $\Lambda$, in ohms$^{-1}$·cm$^{-1} \times 10^{-3}$ and the x-axis shows molar concentration, C, of $Li_2S$. The operation was performed at 16° C. It can be clearly seen from the graph that the conductivity does not change once the molar concentration of $Li_2S$ reaches about 0.5. This constitutes a preferred solution in which there is substantially one molecule of $Li_2S$ for every two molecules of $AlCl_3$, giving a formula close to $Al_2Cl_6SLi_2$.

Figure 3:
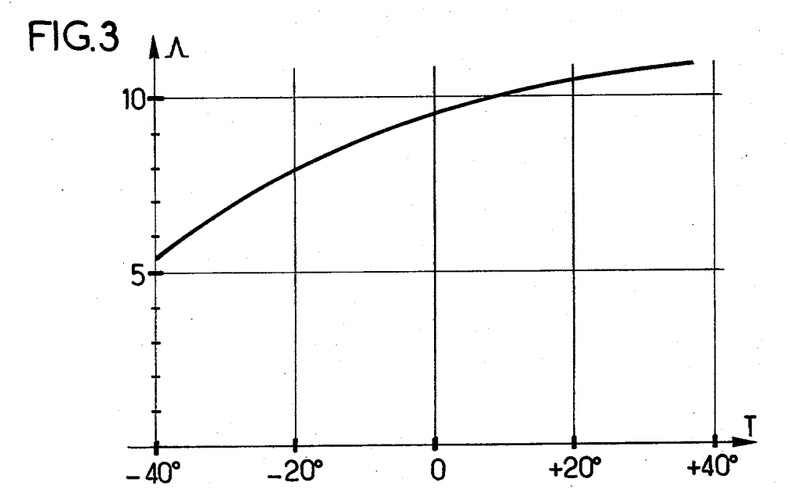
FIG. 3 shows the variation in the conductivity of a solution of the $Al_2Cl_6SLi_2$ complex salt with varying temperature.

The variation in the conductivity of the solution with half a mole of $Li_2S$ per liter against temperature is shown in the graph of FIG. 3, where the y-axis represents conductivity, $\Lambda$, in ohms$^{-1}$ cm$^{-1} \times 10^{-3}$ and the x-axis represents temperature, T, in degrees centigrade. As can be seen, the conductivity is suitable for the electrolyte of a lithium cell even at $-40°$ C.

By doubling concentrations of the solution (i.e. with 2 M of $AlCl_3$ and 1 M of $Li_2S$) a conductivity of $16 \times 10^{-3}$ ohm$^{-1}$ cm$^{-1}$ can be obtained.

Figure 4:
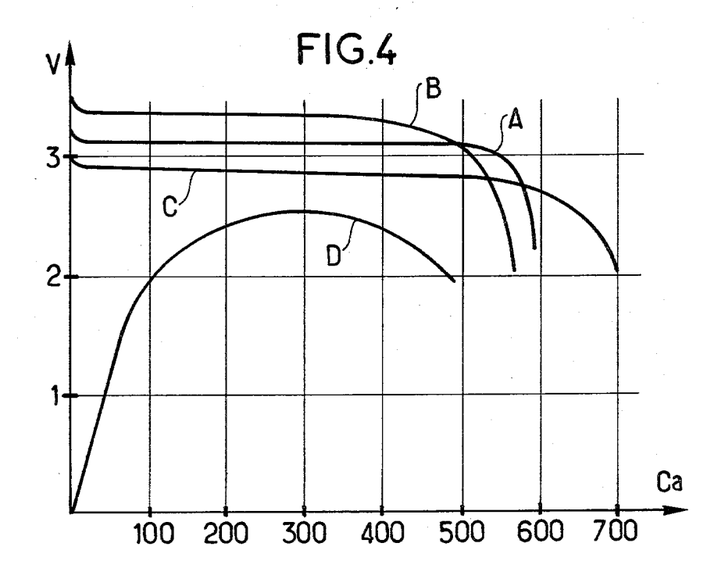
FIG. 4 shows the discharge curves of a prior art cell compared with those of cells in accordance with the invention using the $Al_2Cl_6SLi_2$ complex salt.

FIG. 4 shows the discharge curve firstly of prior art cells where the electrolyte is a molar solution of tetrachloroaluminate in thionyl chloride and secondly of cells in accordance with the invention where the electrolyte results from the reaction of lithium sulphide with the aluminum chloride in the thionyl chloride, with the concentrations of aluminum chloride and lithium sulphide being respectively 1 mole/liter and 0.5 mole/liter. The x-axis shows the capacity, Ca, in mAh as discharged through a resistance of 75 ohms, and the y-axis shows the potential, V, of a cell in volts.

Curve A shows the discharge of a fresh prior art cell.

Curve B shows the discharge of a cell in accordance with the invention after storage at 25° C. for 21 days.

Curve C shows the discharge of a cell in accordance with the invention after storage at 25° C. for 21 days and at 70° C. for 14 days.

Curve D shows the discharge of a prior art cell after storage at 70° C. for 14 days.

As can be seen from curves A and B, a fresh prior art cell and a cell in accordance with the invention after storage at 25° C. have substantially the same capacity.

Curve C shows that after storage at 70° C., the discharge of a cell in accordance with the invention gives a rather larger capacity than that of a cell stored at 25° C. although the potential is a little lower. In contrast, curve D for the prior art cell after storage at 70° C. exhibits a slow rise in potential and it remains inferior to a cell in accordance with the invention both for potential and for capacity.

Figure 5:
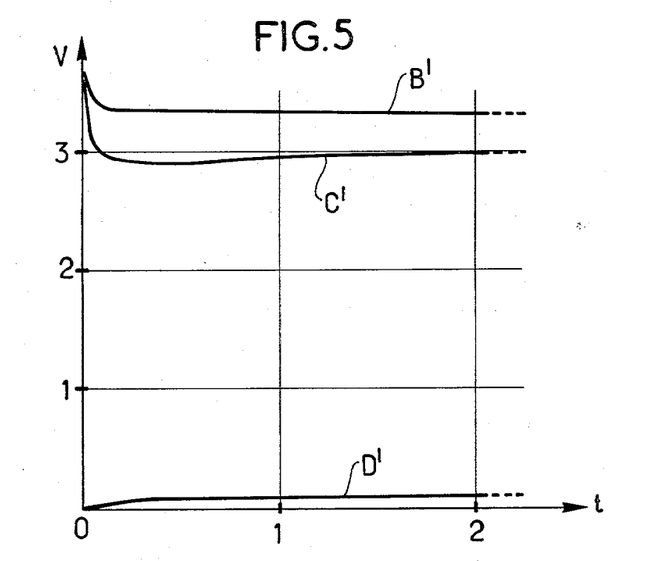
FIG. 5 shows the first few minutes of the discharge curve of a prior art cell and of cells in accordance with the invention of the types shown in FIG. 4.

FIG. 5 shows the first few minutes of discharge through a 75 ohms resistance of a prior art cell after storage at 70° C. for 14 days (curve D') and of cells in accordance with the invention after storage at 25° C. for one month (curve B') and after storage at 25° C. for one month followed by storage at 70° C. for 14 days (curve C'). The x-axis shows time, t, in minutes and the y-axis shows potential, V, in volts. As can be seen, the potential of cells in accordance with the invention levels off almost immediately, whereas the prior art cell begins with a potential of about zero volts. The potential of the prior art cell does not level off until more than one and a half hours have elapsed.

FIGS. 6 to 9 relate to a second type of electrolyte prepared in a similar manner to the first type, but replacing the lithium sulphide with lithium oxide $Li_2O$ which was added little by little to a 1 M solution of aluminum chloride in thionyl chloride.

Figure 6:
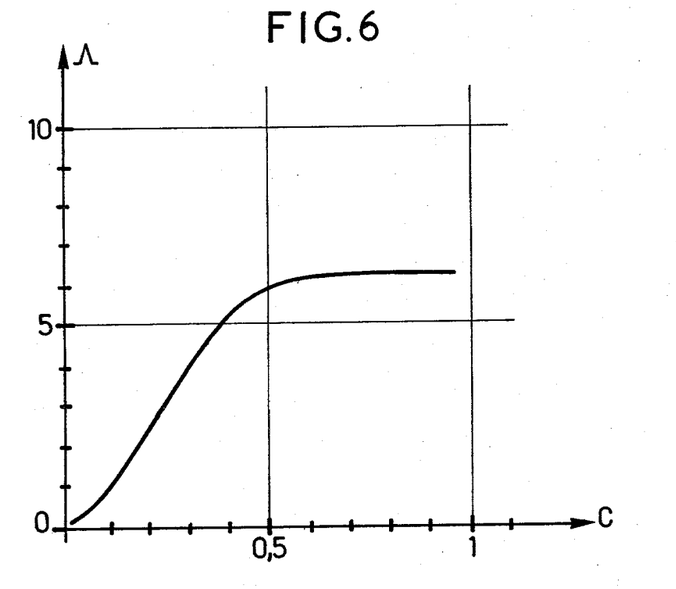
FIG. 6 shows the variation of the conductivity of a solution of aluminum chloride in thionyl chloride while lithium oxide is added thereto.

FIG. 6 shows the conductivity, $\Lambda$, in ohms$^{-1}$ cm$^{-1} \times 10^{-3}$ on the y-axis as a function of the molar concentration, C, of lithium oxide $Li_2O$ on the x-axis. It can be seen that the conductivity does not change once the molar concentration of $Li_2O$ reaches about 0.5. (The operation was performed at 16° C.). At this concentration the solute has a composition of one molecule $Li_2O$ for every two molecules of $AlCl_3$ which gives a formula near to $Al_2Cl_6OLi_2$ which can be called lithium oxychloroaluminate.

Figure 7:
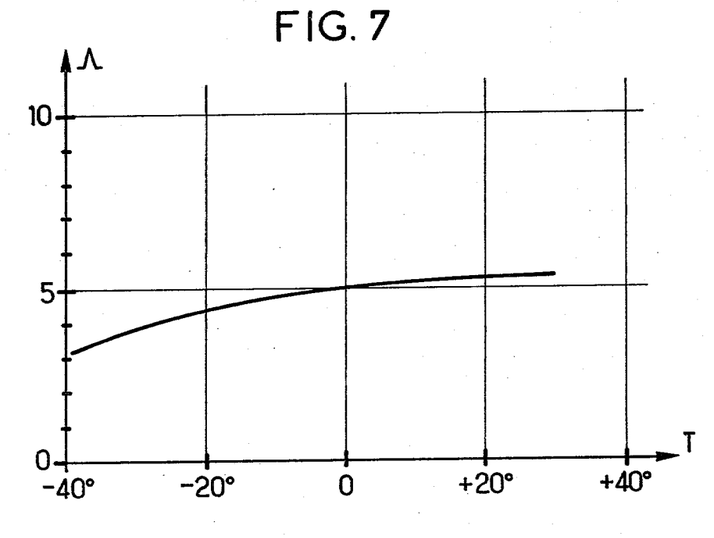
FIG. 7 shows the variation in the conductivity of a solution of the $Al_2Cl_6SLi_2$ complex salt with varying temperature.

The variation in the conductivity of a solution having $\frac{1}{2}$ mole of lithium oxychloroaluminate per liter is shown on the graph of FIG. 7 in which conductivity, $\Lambda$, in ohms$^{-1}$ cm$^{-1} \times 10^{-3}$ is plotted along the y-axis against temperature, T, in degrees centigrade plotted along the x-axis. Although much less than the conductivity of an analogous solution of lithium thiochloroaluminate at the same temperatures, the present conductivity is nonetheless sufficient for the electrolyte of a cell. It should also be noted that the conductivity is considerably improved when the overall concentration is increased while retaining the same proportion of oxide to aluminum chloride.

Figure 8:
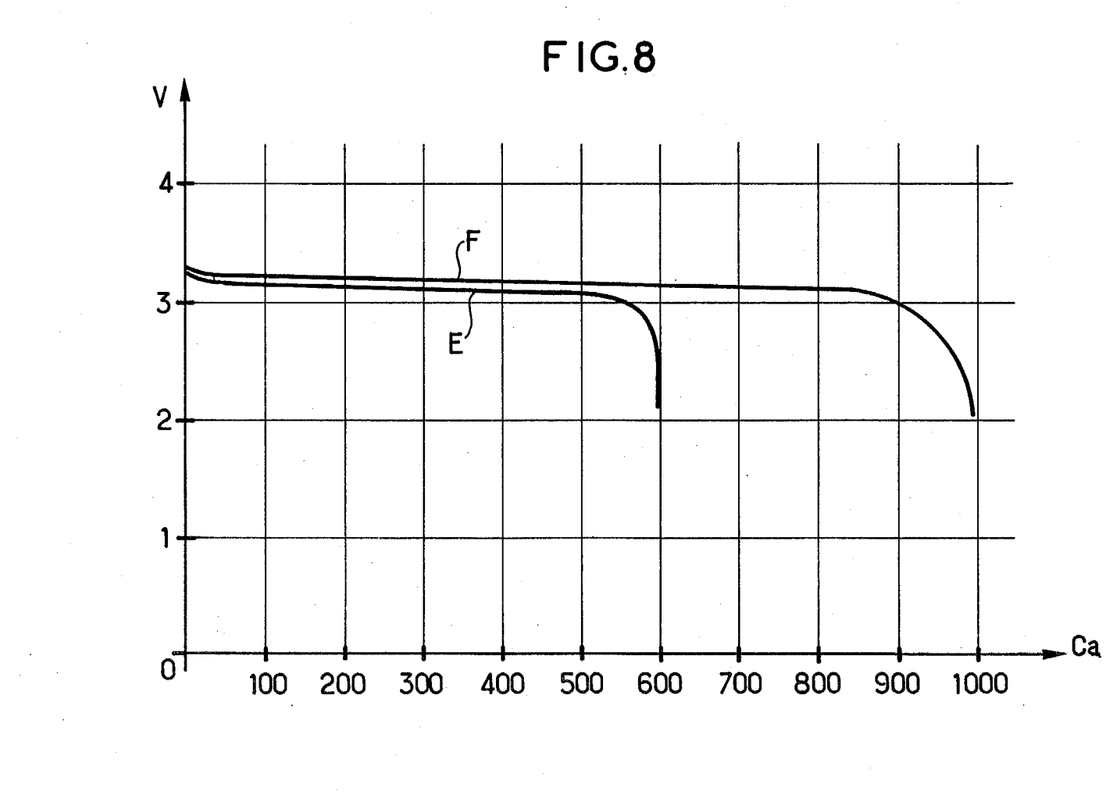
FIG. 8 shows the discharge curve of a prior art cell and of a cell in accordance with the invention using the $Al_2Cl_6OLi_2$ complex salt.

FIG. 8 shows the discharge curve of a cell according to the prior art where the electrolyte is a molar solution of lithium tetrachloroaluminate in thionyl chloride, and of a cell in accordance with the invention using the $Al_2Cl_6OLi_2$ complex salt. The cells were fresh cells discharged through a resistance of 75 ohms. Discharge capacity, Ca, is plotted along the x-axis in mAh and discharge potential is plotted along the y-axis in volts. The curve E is the discharge curve of the prior art cell and the curve F is the discharge curve of the cell in accordance with the invention.

Figure 9:
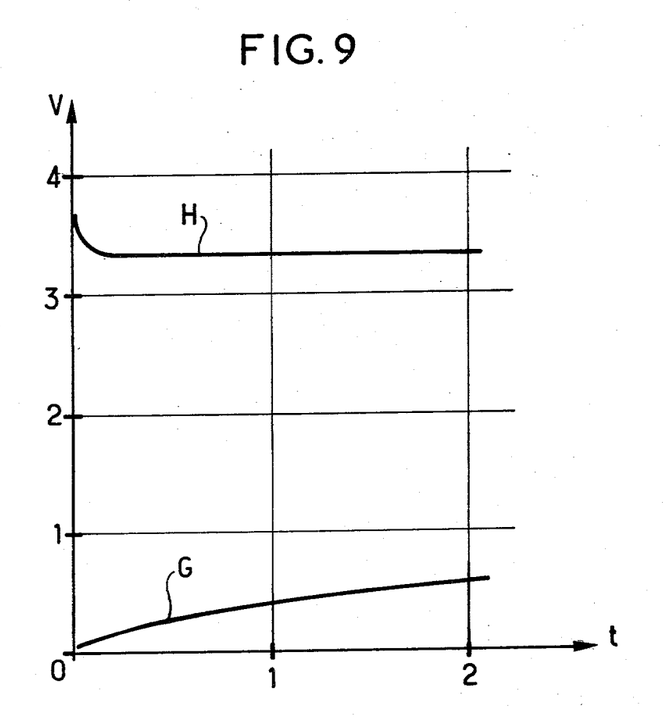
FIG. 9 shows the first few minutes of the discharge curves of cells according to the prior art and according to the invention using the $Al_2Cl_6OLi_2$ complex salt after storage at 70° C.

Other cells were stored at 70° C. for 4 days, and FIG. 9 shows the first few minutes of their discharge. The discharge time t in minutes is plotted along the x-axis and the potential V is plotted along the y-axis in volts. The curve G corresponds to the discharge of a prior art cell while the curve H corresponds to the discharge of a cell in accordance with the invention. It can be seen that the prior art cell exhibits a slow rise in potential. It does not reach three volts until after about ten minutes, while the cell in accordance with the invention operates at 3.35 volts almost immediately.

Likewise, cells in accordance with the invention and discharged at 14° C. operated from the first at 3 volts, whilst prior art cells did not reach their rated discharge potential, and lithium-sulphur dioxide cells of the same capacity exhibited a delay of 30 to 40 seconds before their potentials rose.

Figure 10:
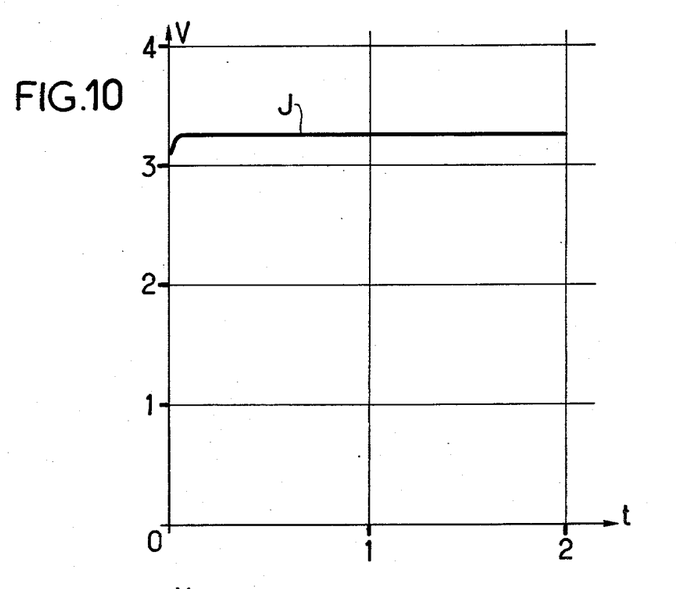
FIG. 10 shows the first few minutes of the discharge curve, J, of a cell in accordance with the invention using the $Al_2Cl_6OCa$ complex salt.
Figure 11:
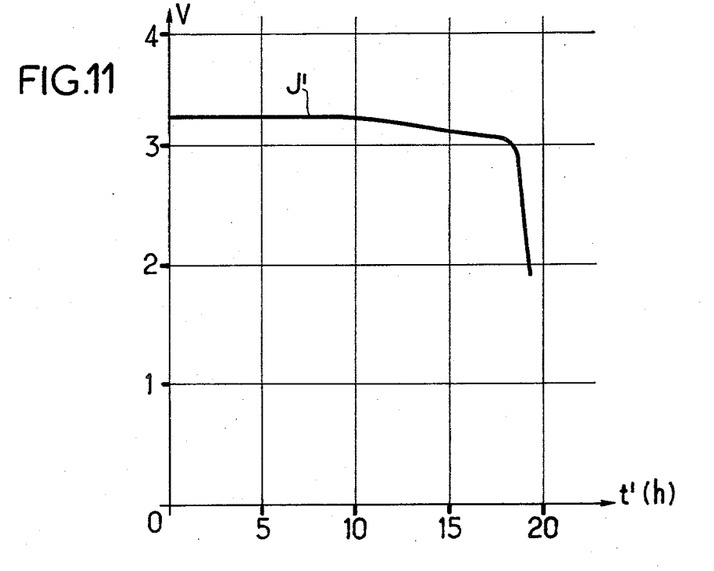
FIG. 11 shows the discharge curve, J', of the cell of FIG. 10 as a function of time t' in hours.

Salts other than lithium salts are capable of reacting with aluminum chloride to give analogous compounds with comparable effects. Thus by making calcium oxide or barium oxide react with aluminum chloride compounds the formula $Al_2Cl_6OCa$ or $Al_2Cl_6OBa$ are obtained. Nonetheless these compounds are more difficult to dissolve in thionyl chloride than the lithium salts and it requires a lengthy process to arrive at a concentration of 0.5 M. However, using a 0.15 M solution as an electrolyte (i.e. 0.3 M of $AlCl_3$) cells have been made identical to the preceding examples. The discharge performance of such cells is shown in FIGS. 10 and 11. The discharge is through 75 ohms as before. The cell potential V is plotted along the y-axis in volts and time is plotted along the x-axis. (For graph J time t is in minutes while for graph J' time t' is in hours). It can be seen that there is substantially no delay before the cell potential rises. These cells were previously stored for ten days at 25° C. It can be seen that even with a fairly dilute electrolyte which is therefore of low conductivity (about $1.5 \times 10^{-3}$ ohm$^{-1}$ cm$^{-1}$) and even at a fairly high rate of discharge, the discharge lasts for nearly 20 hours i.e. the capacity is greater than 800 mAh.

Naturally, the invention is not limited to the above examples. Various modifications can be made to the composition of the electrolyte/positive active material of these cells without going beyond the scope of the claims. For example, the electrolyte could include a co-solvent such as phosphoryl chloride. A portion of the lithium oxide may be replaced by lithium chloride or by lithium sulphide or by a mixture of these materials. The concentration of the electrolyte may also be modified. And finally, a cell in accordance with the invention may have a totally different geometrical configuration from that described.

We claim:

1. An electrochemical primary cell whose negative active material is lithium, whose positive active material includes thionyl chloride, and whose electrolyte consists essentially of a solution of, as a solute, a complex salt resulting from the reaction of aluminum chloride with an ionisable compound selected from the group consisting of lithium oxide ($Li_2O$), calcium oxide (CaO), and barium oxide (BaO), dissolved in thionyl chloride.

2. A cell according to claim 1, including lithium sulphide in its electrolyte at a molar concentration substantially equal to half the molar concentration of the aluminum chloride.

3. A cell according to claim 1, including lithium oxide in its electrolyte at a molar concentration substantially equal to half the molar concentration of the aluminum chloride.

4. A cell according to claim 1, including calcium oxide or barium oxide in its electrolyte at a molar concentration substantially equal to half the molar concentration of the aluminum chloride.

5. A cell according to claim 1, wherein the positive electrode includes a porous carbon collector (2).

6. A cell according to claim 5, wherein said collector is constituted by a mixture of acetylene black and polytetrafluoroethylene with about 15% by weight polytetrafluoroethylene, and having a porosity of about 82%.

7. A cell according to claim 1, wherein the electrolyte further includes phosphoryl chloride as a solvent.

8. A cell according to claim 1, wherein the ionisable compound further includes lithium chloride.

9. An electrochemical primary cell whose negative active material is lithium, whose positive active material includes thionyl chloride, and whose electrolyte consists essentially of a solution of, as a solute, a complex salt selected from the group consisting of complex salts represented by the empirical formulae $Al_2Cl_6OLi_2$, $Al_2Cl_6OBa$ and $Al_2Cl_6OCa$, dissolved in thionyl chloride.

10. A cell according to claim 9 wherein said complex salt is represented by the empirical formula $Al_2Cl_6OLi_2$.

11. A cell according to claim 9 wherein said complex salt is represented by the empirical formula $Al_2Cl_6OBa$.

12. A cell according to claim 9 wherein said complex salt is represented by the empirical formula $Al_2Cl_6OCa$.

13. A cell according to claim 9 wherein the concentration of said complex salt is at least about 0.15 molar.

14. A cell according to claim 9 wherein the electrolyte further includes phosphoryl chloride as a solvent.

15. A cell according to claim 9 wherein the solute further includes lithium chloride.

* * * * *